United States Patent [19]
Ruprecht et al.

[11] 3,772,865
[45] Nov. 20, 1973

[54] DRUM TYPE MOWER

[75] Inventors: Hermann Ruprecht, Singen; Josef Glunk, Gottmadingen, both of Germany

[73] Assignee: Maschinenfabrik FAHR AG, Gottmadingen, Germany

[22] Filed: Mar. 6, 1972

[21] Appl. No.: 231,866

[52] U.S. Cl. .................................. 56/192, 56/371
[51] Int. Cl. ........................................... A01d 57/30
[58] Field of Search ............. 56/1, 192, 371, DIG. 1

[56] References Cited
FOREIGN PATENTS OR APPLICATIONS

| | | | |
|---|---|---|---|
| 1,520,474 | 3/1968 | France | 56/192 |
| 264,891 | 9/1968 | Austria | 56/192 |
| 1,578,285 | 8/1969 | France | 56/DIG. 1 |
| 2,004,285 | 8/1970 | Germany | 56/DIG. 1 |
| 1,520,475 | 4/1968 | France | 56/192 |

Primary Examiner—Louis G. Mancene
Assistant Examiner—J. A. Oliff
Attorney—Karl F. Ross

[57] ABSTRACT

A multidrum mower in which an array of mower drums is provided across the direction of travel of the mowing machine and a rotary windrow-forming deflecting drum is provided behind the mowing drums. Between the mowing and windrow-forming drums there is provided a guide surface which may be movable or stationary to lead the mown crop onto the rearwardly disposed drum.

9 Claims, 10 Drawing Figures

FIG. 5
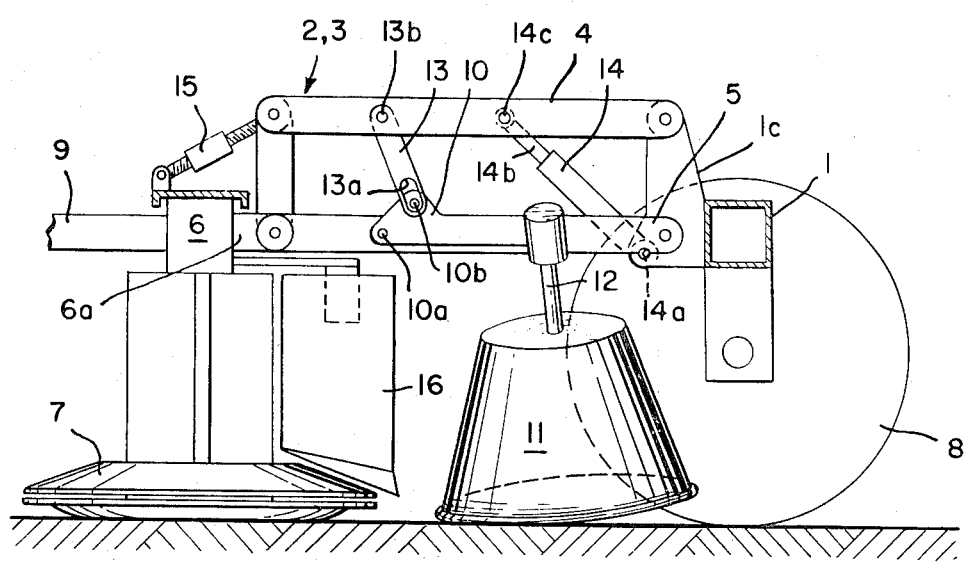
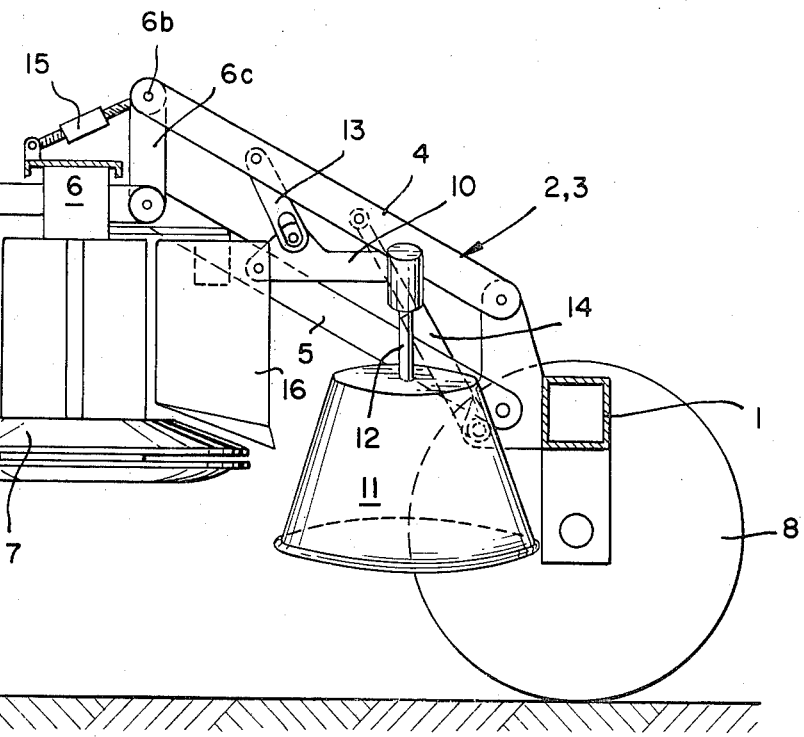
FIG. 6

DRUM TYPE MOWER

CROSS-REFERENCE TO RELATED APPLICATIONS

The present application relates to rotary-mowing machines of the drum type as described in the commonly owned copending applications Ser. Nos. 85,504 and 85,505, both filed 30 Oct. 1970 by one of the present joint applicants and another and since issued as U.S. Pat. Nos. 3,662,529 and 3,656,286, said applications being, in turn, copending with application Ser. No. 824,405, since issued as U.S. Pat. No. 3,572,019, as assigned to the common owner of the above-mentioned applications and the instant case.

FIELD OF THE INVENTION

Our present invention relates to rotary mowers and, more particularly, to a rotary mower adapted to be drawn by a tractor or the like and provided with a plurality of mower assemblies rotatable about generally upright axes and carried by a common support beam or similar arrangement.

BACKGROUND OF THE INVENTION

In conventional rotary-drum mowers, the mower assembly comprises a beam adapted to be displaced transversely to the direction of movement and carrying a plurality of mower assemblies having generally a drum-shaped configuration, the lower portion of the drum being formed with cutting edges adapted to sever the stalks of a crop material close to the ground surface. The assembly comprises, above the blade portion which may be of downwardly divergent frustoconical configuration, a generally cylindrical body portion which serves to guide the crop material between the pairs of counterrotating assemblies or in opposite directions when each assembly co-operates with yet another such assembly to form counterrotating pairs.

Such mowers have advantages over reel-type mowers in which the cutting edges are rotating about generally horizontal axes, in that there is little tendency for the blade arrangement to cast the crop material upwardly or rearwardly except in the form of a windrow so that little or no raking is required for windrow formation whenever the rotary mower assembly has a generally upright axis in the manner described. The system also has certain advantages over sickle-bar mowers, again in the sense that the crop material is deposited in narrow strips or windrows which may be of a lesser width than the swath cut through the field.

It has been proposed in connection with such rotary mowers to provide windrow-forming means, generally in the form of deflecting blades or plates to restrict the rearwardly moving crop material to the narrow width of the desired windrow. It has also been suggested to provide rotary members immediately and directly behind the rotary mower assembly to guide the crop material into a windrow or to deposit the crop material in a neat but narrow blanket.

In practice, neither of these systems has been found to be free from disadvantages, the first being prone to accumulations of crop material and blockage, while the latter has been incapable of accurately directing the rearwardly moving stream of crop material and frequently causing portions thereof to pass to either side of the rotary deflector. The latter disadvantage is especially significant since a further raking may then be necessary.

OBJECTS OF THE INVENTION

An object of the invention is to prevent the distribution of crop material along the sides of the desired windrow and to eliminate blockages of the type hitherto encountered in the use of deflecting blades in connection with rotary mower assemblies.

It is also an object of the invention to provide an improved mower for field crops which can more satisfactorily deposit mown crop material in a windrow or the like.

It is another object of the invention to provide a system for the purposes described which extends the principles set forth in the copending applications mentioned earlier.

SUMMARY OF THE INVENTION

The forgoing objects are obtained, in accordance with our present invention, in a rotary mower of the general class described, having a support beam movable transversely to its major dimension, i.e. a beam or support which extends transversely to the direction of movement of the mower, and at least one pair of rotary mower assemblies having generally upright axes and rotatably mounted on this beam to undercut a crop material and guide it past the mower assemblies. The invention resides in providing, rearwardly of the mower assemblies and in the path of the crop material entrained therewith, a transport surface which intercepts the crop material and feeds it in the direction of the windrow and, rearwardly of this transport surface, a rotary windrow-forming member whose axis may be off the vertical and which is designed to intercept the crop material flowing along the transport surface and to deposit it upon the windrow with a downward component of movement.

According to the present invention, the windrow-forming rotatable member is a windrowing drum rotatable about an axis inclined somewhat to the vertical, preferably at an acute angle, and having a generally frustoconical configuration with its broad base downwardly. The windrowing drum according to the invention lies behind the space between a pair of mowing drums and can either be freely rotatable (i.e., rotated by the stream of crop material alone, or driven by the drive means for the mower assembly, e.g., via a suitable transmission. The transport surface is, according to the invention, located generally in a vertical plane and may comprise a plate, preferably as described in the above-mentioned U.S. Pat. No. 3,572,019, or constituted as a movable surface bridging the gap between the windrowing drum and one of the mowing drums. To prevent accumulation of crop material and possible blockage, the transport surface is preferably swingable upwardly about a horizontal axis. The transport surface may, according to another feature of the invention, consist of a belt arrangement directly connecting the mowing drum with the windrowing drum or bridging a pair of idlers between these drums so that the transport surface may be of the static type (e.g., the aforementioned plate) or of the dynamic conveyer-belt type. In the latter case, it may be driven by the stream of crop material with advance of the mower or can be forcibly driven by a transmission arrangement from the mower-assembly drive or by direct contact with the mower-assembly drum.

It has been found to be advantageous, moreover, to mount the windrowing drum on the frame or support for the mower assemblies for swinging movement about a horizontal axis and, advantageously, on a support arm, connected to or forming a link of a parallelogrammatic linkage whereby the mower assemblies are coupled to a carriage or a like support.

To shift the windrowing drum into its operating position, we provide a traction rod for the support arm of this drum, an end of the traction rod being connected with the upper link of the parallelogrammatic linkage. As the mower drums are raised, the windrowing drum is swung into the free space between the mower assemblies and their frame or support.

According to another feature of the invention, the windrowing drum is provided at its lower end, along the periphery proximal to the ground and to the path of the crop material, with a plurality of entraining elements or fingers. The entraining fingers may be located at the broad base of the frustoconical periphery and are preferably constituted as spring tongues adapted to deflect upon engagement with the ground and hence unaffected by contact therewith. The tips of these tongues may be either turned radially inwardly or radially outwardly and may also be inclined upwardly or downwardly as desired.

According to yet another feature of the invention, the windrowing drum is provided with a plurality of circumferentially spaced staves which may extend through a circular support at the lower periphery of the drum via passages receiving these staves with clearance. In this case, the free end of each stave forms one of the aforementioned tongues; both the stave and its tongue are elastically yieldable and have some play within the aforementioned passages. The staved drum has the advantage that an effective advance of the crop material is possible with little likelihood of damage to the windrowing drum or to the crop material.

DESCRIPTION OF THE DRAWING

The above and other objects, features and advantages of the present invention will become more readily apparent from the following description, reference being made to the accompanying drawing in which:

FIG. 5 is a detail view showing the preferred arrangement for shifting the windrowing drum;

FIG. 6 is a view similar to FIG. 5 showing the parts in yet another position;

SPECIFIC DESCRIPTION

Figure 1:
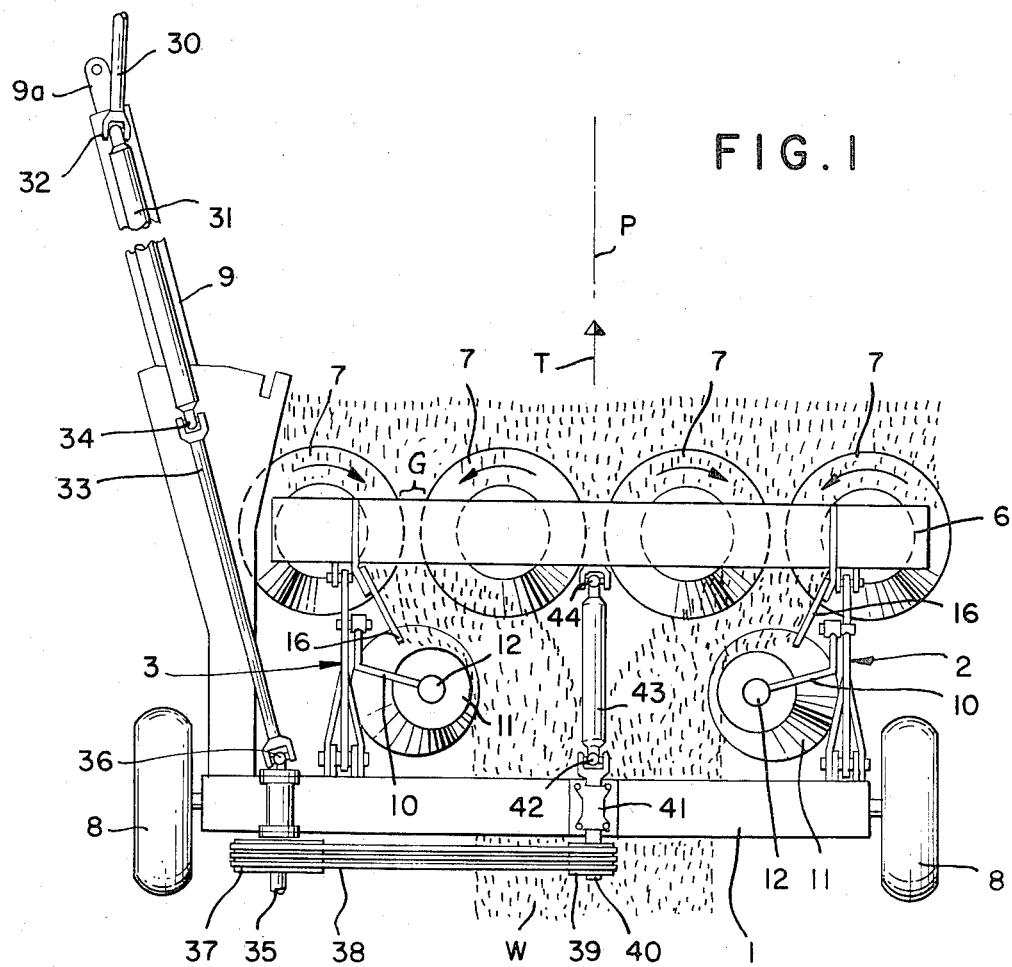
FIG. 1 is a plan view of a mower according to the invention, partially illustrated in diagrammatic form.
Figure 2:
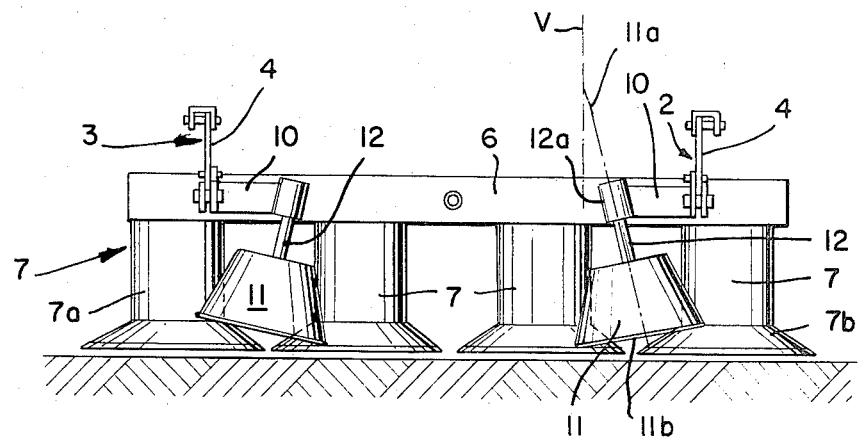
FIG. 2 is a rear-elevational thereof.

In FIGS. 1 and 2, we have shown an embodiment of the invention which comprises a frame, support or carriage 1 having a tow bar 9 adapted to be connected at its lug 9a by a vertical pin to the draw bar of a tractor and mounted upon a pair of ground-engaging wheels 8. The support 1 carries a pair of parallelogrammatic linkages 2 and 3 at its opposite ends for supporting a mower beam 6, each of the parallelogrammatic linkages having an upper link 4 (FIGS. 5 and 6) parallel to the lower link 5.

The beam 6 is articulated by its lugs 6a to the forward lower pivot of the linkage 2, 3, and carries a plurality of mower drums 7 rotatable about respective generally vertical (upright) axes. The mower assemblies, which may have the configuration of the assemblies described in U.S. Pat. No. 3,572,019 or applications Ser. Nos. 85,504 and 85,505, generally have cylindrical body portions 7a overlying outwardly and downwardly frustoconically diverging aprons 7b, swingable blades or the like being provided on or beneath these aprons as described in the latter applications.

The mower assemblies 7 are driven by bevel gearing, chains, belts or universal joint shafts as will be described in greater detail in connection with FIG. 9. For the present, it suffices to note that the drive means includes a power take-off shaft 30 attached to the power take-off stop shaft of the tractor, generally by a spline or keying arrangement, a main shaft 31 connected to shaft 30 at a universal joint 32 and connected to a shaft 33 at the universal joint 34. Shaft 33, in turn, drives a shaft 35 via the universal joint 36 and thus rotates the multibelt V-pulley 37. Belts 38 connect the pulley 37 with a driven pulley 39 whose shaft 40 is received in a journal block 41 of the support 1. A universal joint 42 connects shaft 40 with a transmission shaft 43 adapted to enable the mower assemblies to be raised and lowered and, consequently, consisting of two angularly interlocked but axially telescoping shaft parts. Another universal joint 44 connects the power take-off to the shafts, belts and transmissions received within the beam 6.

Referring again to FIGS. 5 and 6, it will be seen that each of the parallelogrammatic linkages 2 and 3 comprises a support arm 10 upon which a windrowing drum 11 is mounted so that its axis 11a is inclined to the vertical V by a small acute angle of, say, 5° to 20°. The drum 11, moreover, has an outwardly extending circumferential flange 11b at its base and is of frustoconical configuration with a conical half angle of 5° to 25° as will be apparent from FIG. 2.

The windrowing drums 11 are located between each pair of counterrotating assemblies 7 but are disposed rearwardly thereof such that the axis 11a lies in a line parallel to the direction of travel (arrow T) with a gap (G) between the bar of mower assemblies 7. Each of the windrowing drums 11 is journaled for rotation about its axis 11a on a shaft 12 received in a bearing 12a at the end of the arm 10.

The arm 10 of each windrowing drum is articulated (FIG. 5) to the lower link 5 of the linkage at a fulcrum 10a and is engaged by a traction bar 13 having a slot 13a in which a pin 10b of the support arm 10 is received. The traction bar 13 is articulated, in turn, to the upper link 4 at 13b. Each linkage is, moreover, provided with a hydraulic shaft arrangement comprising the hydraulic cylinder 14 which is articulated at 14a to the upstanding arm 1c rigid with the support member 1. The piston has a piston rod 14b pivotally connected at 14c to the upper link 4. When the hydraulic cylinder 14 is pressurized, the link 4 is raised (FIG. 6) to elevate the mower assembly 7 and swing, via arm 10, the windrowing drum 11 into the space between the support or frame 1 and the array of mower assemblies 7. To adjust the height of the mower assemblies with respect to the ground, a variable-length turnbuckle arrangement 15 is provided between the upper pivot 6b and its arm 6c and the beam 6.

FIG. 1 also shows a system in which vertical plates 16, which lie in vertical planes as described in U.S. Pat. No. 3,572,019, bridge the spaces between the mower assemblies and the windrowing drums while forming guides inclined toward one another in the direction of windrowing formation when a single windrow is desired (FIG. 1) or inclined in the same direction with respect to the direction of travel when two separate windrows are desired as shown in FIG. 3.

Figure 3:
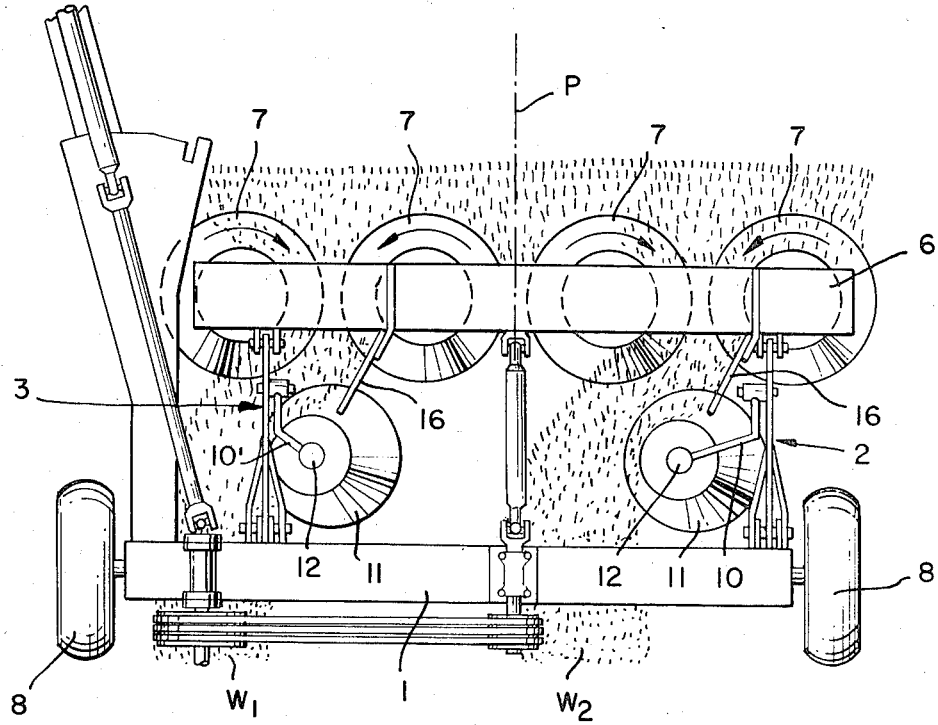
FIG. 3 is a view similar to FIG. 1 of a system for forming a pair of parallel windrows.
Figure 4:
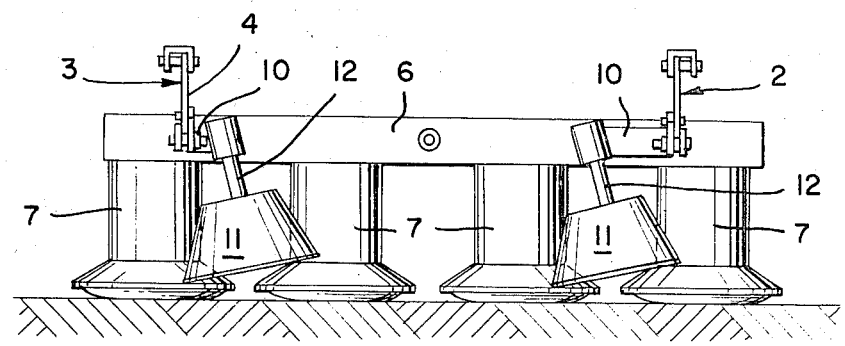
FIG. 4 is an end view of the latter arrangement.

In FIG. 3, of course, the structural elements are the same as those provided in FIGS. 1 and 2 except that the left-hand arm 10 has been replaced by an arm 10' holding the left-hand drum 11 at an angle to the vertical corresponding to that of the right-hand drum so that the two drums are parallel. The plates 16, which may be supported from above via a hinge 16a with a horizontal axis and biased by a leaf spring 16b into the vertical position, prevent the crop material from passing on opposite sides of each windrowing drum.

Where, as in FIG. 1, the windrowing drums are inclined in opposite directions and the plates 16 are similarly inclined in opposite directions to the vertical median plane P, a single windrow W is formed where, however, they are inclined in the same directions, windrows W 1 and W 2 are formed in parallel spaced relation. Accumulations of crop material along the plate 16 deflect the latter to permit clearing as the plate swings upwardly about a horizontal axis.

Figure 7:
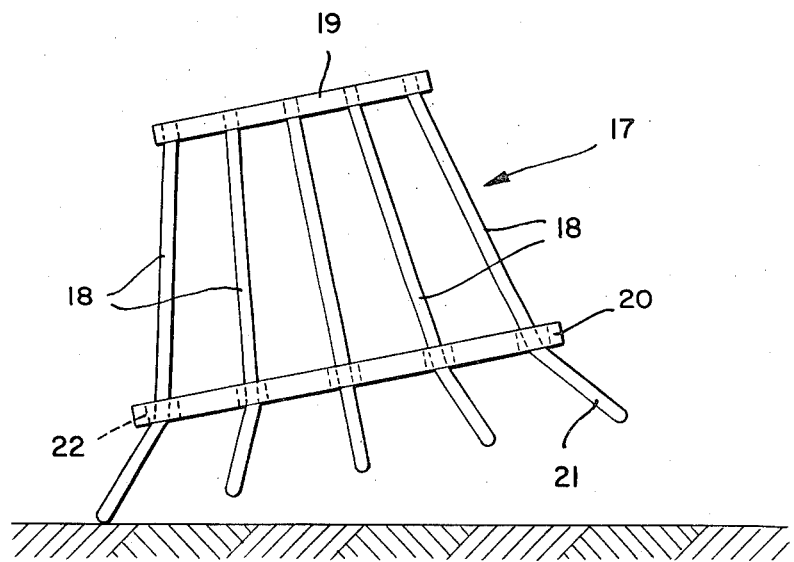
FIG. 7 is an elevational view illustrating a stave-type windrowing drum adapted to be used in the apparatus of FIGS. 1 – 6 and FIG. 9.
Figure 8:
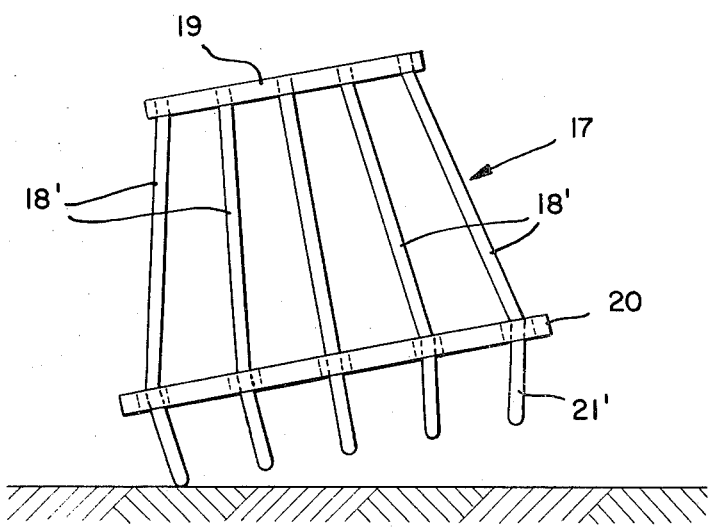
FIG. 8 is a view similar to FIG. 7 of another stave-configuration windrowing drum for use in place of the smooth-surface drums of FIGS. 1 – 6 and 9.
Figure 10:
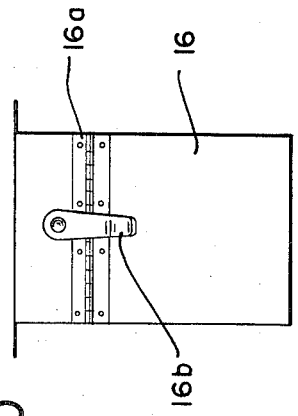
FIG. 10 is an elevational view of a part of the support arrangement for the transport plate of FIGS. 1 and 9.

In FIG. 7, we show an arrangement in which the windrowing drum 17 is provided along its lower periphery with an array or crown of outwardly extending fingers or tongues 21. The drum thus comprises an upper disk 19 and a lower disk 20 the latter being provided with passages 22. Staves 18, fixed at their upper ends to the disk 19, traverse the passages 22 with clearance to form the tongues 21. The latter are inclined downwardly and outwardly with respect to the axis of rotation. In the embodiment of FIG. 8 the staves 18' have inwardly inclined tongues 21' but otherwise act in a manner similar to that of FIG. 7. The staves 18, 18', which run substantially vertically at the point at which the crop material is engaged by the windrowing drum, are nonrotatable about their respective axes but are resilient and carry the crop material yieldably. Engagement of the crown with the tongues 21 or 21' does not damage them and the windrowing drum is effective over its whole length. The drums of FIGS. 7 and 8 have been found to be most satisfactory in the handling of the crop material without damage.

Figure 9:
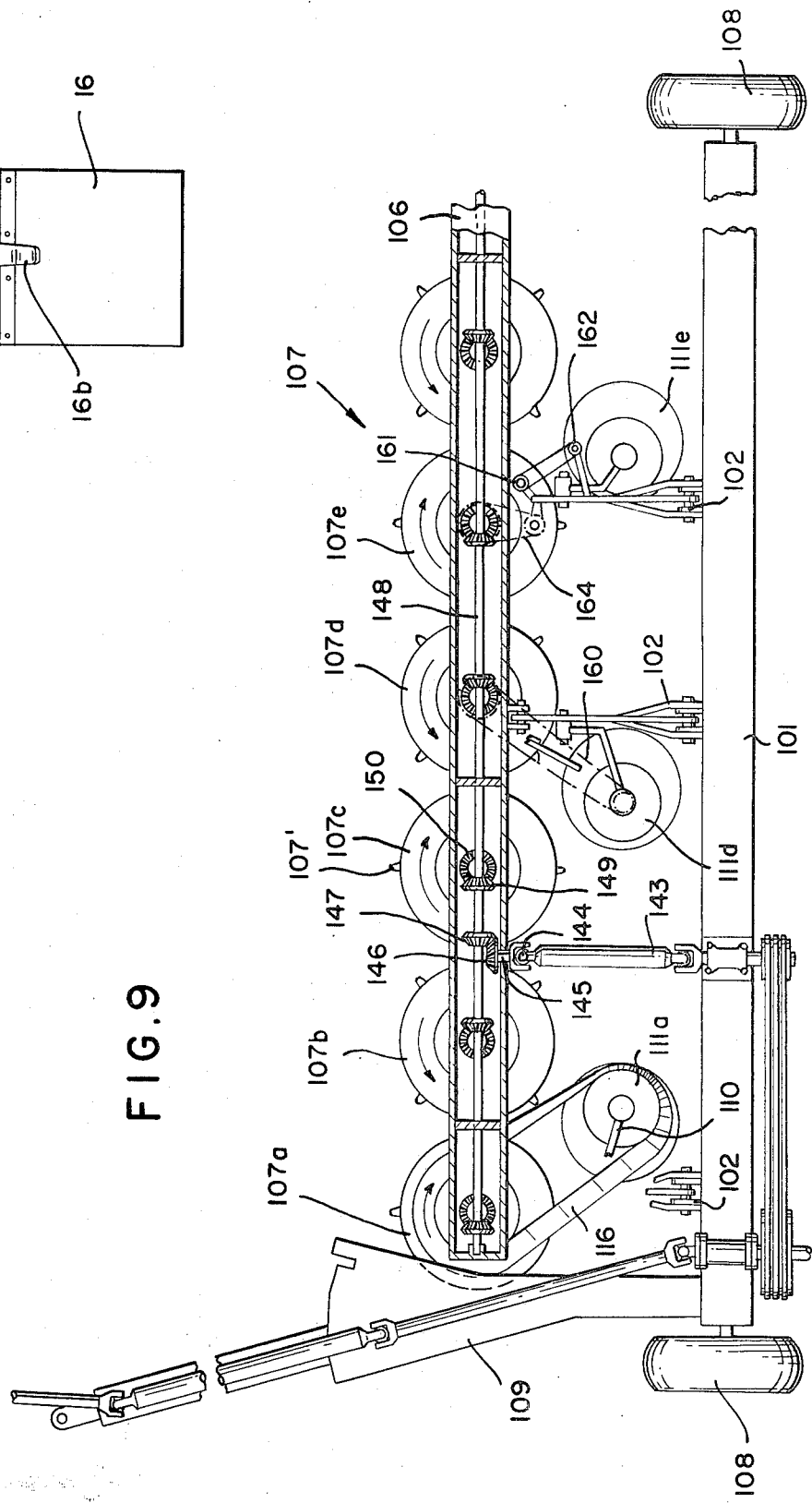
FIG. 9 is a view similar to FIG. 1, partly broken away, of a portion of a mower adapted to form a plurality of windrows.

In the system of FIG. 9, the beam 101 is carried by wheels 108 and is provided with a tow bar 109 as previously described. A plurality of parallelogrammatic linkages 102, spaced along the support 101, carries the beam 106 on which a plurality of mower assemblies 107 is mounted. In the embodiment illustrated, three pairs of mower assemblies are provided. The mower assemblies are formed with blades 107' as described in the copending applications mentioned earlier. From FIG. 9 it should be apparent that the shaft 143, which is driven by a belt system as described in connection with FIG. 1, has its universal joint 144 connected to a shaft 145 having a bevel gear 146 in mesh with bevel gear 147 for the main shaft 148 running along the beam 6. Bevel gears 149 and 150 connect the shaft with the individual mower drums 107 for rotation of the drums of each pair in opposing senses. The drum 107a, for example, may be rotated in the clockwise sense while the drum 107b is rotated in the counter-clockwise sense. In this embodiment, moreover, the plate 16 is replaced by a transport surface 116 in the form of a belt which interconnects the drum 107a with its windrowing drum 111a, the latter being mounted on an arm 110 as described in connection with the drum 11 of FIG. 1 or FIG. 2.

Another pair of drums 107 includes a drum 107c, rotated in the clockwise sense and a counterclockwise drum 107d. In this case, a chain 160 connects the drum 107d with the windrowing drum 111d so that the two are constrained for joint rotation. Finally, the transport surface bridging the drum 107e and its windrowing drum 111e may be a belt lying in a vertical plane and spanning a pair of rollers 161 and 162 carried by arms 163 on the associated linkage 102. If desired, a chain transmission 164 may be provided to operate the surface 116e.

We claim:

1. A mower comprising a support; a plurality of mower assemblies spaced along said support and rotatable about respective generally upright axes; a freely rotatable windrow-forming member mounted on said support rearwardly of said assemblies and having an upright axis of rotation for intercepting crop material from said assemblies and depositing same in a windrow on the ground, said member being rotatable about said axis in either sense; a substantially vertically extending transport surface disposed between said assemblies and said member for leading said crop material to the latter; and means for selectively mounting said transport surface on said support for directing said crop material onto said member in either of said senses.

2. The mower defined in claim 1 wherein said assemblies are provided in at least one pair, said member and said transport surface being associated with said pair of assemblies, said member comprising a windrowing drum journaled on said support for rotation about a generally upright axis inclined slightly to the vertical, said surface lying in a generally vertical plane.

3. The mower defined in claim 2 wherein said surface is a plate mounted on said support.

4. The mower defined in claim 3, further comprising pivot means fixing said plate to said support for upward swinging movement about a generally horizontal axis.

5. The mower defined in claim 4, further comprising means for swingingly mounting said member on said support.

6. The mower defined in claim 5 wherein the last mentioned means includes a parallelogrammatic linkage between said support and said assemblies, an arm pivotally connected to said linkage and carrying said member, means for displacing said linkage to elevate said assemblies, and a traction bar connected to said arm for swinging said member between said support and said assemblies.

7. The mower defined in claim 2 wherein said member is formed with a plurality of circumferentially spaced downwardly extending elastically deflectable tongues.

8. The mower defined in claim 7 wherein said member is provided with a plurality of circumferentially spaced staves, each of said tongues forming an extension of one of said staves.

9. The mower defined in claim 8 wherein said staves are anchored at one end and are limitedly deflectable over their lengths.

* * * * *

UNITED STATES PATENT OFFICE
CERTIFICATE OF CORRECTION

Patent No. 3,772,865  Dated 20 November 1973

Inventor(s) Hermann RUPRECHT , Josef GLUNK

It is certified that error appears in the above-identified patent and that said Letters Patent are hereby corrected as shown below:

In the heading, after line [21] insert:

-- [30] Foreign Application Priority Data

5 March 1971   Germany   P 21 10 622.9 --

Signed and sealed this 23rd day of July 1974.

(SEAL)
Attest:

McCOY M. GIBSON, JR.
Attesting Officer

C. MARSHALL DANN
Commissioner of Patents